US006658829B2

(12) United States Patent
Kobayashi et al.

(10) Patent No.: US 6,658,829 B2
(45) Date of Patent: Dec. 9, 2003

(54) ELECTRIC LAWN MOWER

(75) Inventors: Takao Kobayashi, Wako (JP); Tetsuo Iida, Wako (JP); Kenzou Shimada, Wako (JP); Norikazu Shimizu, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 10/084,061

(22) Filed: Feb. 26, 2002

(65) Prior Publication Data

US 2003/0037522 A1 Feb. 27, 2003

(30) Foreign Application Priority Data

Aug. 22, 2001 (JP) ........................................ 2001-252052

(51) Int. Cl.[7] .............................................. A01D 69/02
(52) U.S. Cl. .......................................... 56/10.5; 56/11.9
(58) Field of Search ................................ 56/10.5, 11.9, 56/14.7, 16.7, 11.3, 11.7; 180/279

(56) References Cited

U.S. PATENT DOCUMENTS

| 3,581,480 | A | * | 6/1971 | O'Connor et al. ........... 56/11.9 |
| 3,602,728 | A | * | 8/1971 | Carpenter .................... 307/140 |
| 3,841,069 | A | * | 10/1974 | Weck ............................ 56/10.5 |
| 4,333,302 | A | * | 6/1982 | Thomas et al. ............... 56/10.5 |
| 4,446,680 | A | * | 5/1984 | D'Alessandro .............. 56/11.9 |
| 4,882,897 | A | * | 11/1989 | Oshima et al. .............. 56/11.3 |
| 4,995,227 | A | * | 2/1991 | Foster ........................... 56/249 |
| 5,203,147 | A | * | 4/1993 | Long ............................ 56/10.5 |
| 5,355,662 | A | * | 10/1994 | Schmidt ....................... 56/11.3 |
| 5,375,674 | A | | 12/1994 | Peter ........................... 180/19.3 |
| 5,402,626 | A | * | 4/1995 | Zinck ........................... 56/11.9 |
| 5,606,851 | A | * | 3/1997 | Bruener et al. .............. 56/11.9 |
| 5,619,845 | A | * | 4/1997 | Bruener et al. .............. 56/11.9 |
| 6,170,241 | B1 | * | 1/2001 | Shibilski et al. ............. 56/11.9 |

FOREIGN PATENT DOCUMENTS

| FR | 2348644 | 11/1977 |
| JP | 06038611 | 2/1994 |
| JP | 09000036 | 1/1997 |
| WO | WO 91/15107 A1 | * 10/1991 |

* cited by examiner

Primary Examiner—Robert E. Pezzuto
Assistant Examiner—Nathan Mammen
(74) Attorney, Agent, or Firm—Adams & Wilks

(57) ABSTRACT

Switch operation mechanism includes a handling lever pivotally connected to a portion of a handle, a generally-fan-shaped actuating member pivotally connected at its pivot portion to the handle in such a manner that the actuating member is pivotable in response to operation, by a human operator, of the handling lever, and a noncontact reed switch for turning on or off a cutter-driving electric motor in accordance with an ON/OFF state of the noncontact reed switch. The ON/OFF state of the noncontact reed switch is determined in accordance with pivoting movement, toward or away from the switch, of the actuating member responsive to the operation of the handling lever. With such arrangements, the switching operations of the operation mechanism can be performed accurately in a stable manner.

17 Claims, 12 Drawing Sheets

ELECTRIC LAWN MOWER

FILED OF THE INVENTION

The present invention relates to electric lawn mowers of the type which includes a cutter blade driven via an electric motor mounted in a machine body section and a handle extending rearward from the machine body section, and in which a switch operation mechanism for performing ON/OFF control of the motor is provided on the handle.

BACKGROUND OF THE INVENTION

Electric lawn mowers are known, for example, from Japanese Patent Laid-open Publication Nos. HEI-6-38611 and HEI-9-36. The electric lawn mower disclosed in the HEI-6-38611 publication includes first and second housings mounted on left and right side portions, respectively, of a handle, and a handling lever pivotally connected to the first and second housings. A power switch and activation button are accommodated in the first housing so that the power switch can be turned on/off by a proximal end portion of the handle operating on the activation button.

The electric lawn mower disclosed in the HEI-9-36 publication includes a clutch lever pivotally connected to a grip portion of the handle, and a cutter-blade clutch switch provided on a proximal end portion of the handle. Here, the cutter-blade clutch switch is operatively connected to the clutch lever by means of a connecting spring in such a manner that it can be controlled remotely via the clutch lever.

However, in the first-mentioned prior art electric lawn mower, there has to be provided the activation button between the handling lever and the power switch to achieve matching between the pivoting range of the handling lever and the switching stroke of the power switch, and thus a complicated structure would be required for the switching operations. Further, in the second-mentioned prior art electric lawn mower, there has to be provided the connecting spring between the cutter-blade clutch switch and the clutch lever and the switching stroke of the clutch switch, and thus the switching operations tend to be inaccurate.

SUMMARY OF THE INVENTION

In view of the foregoing prior art problems, it is an object of the present invention to provide an improved electric lawn mower which includes a switch operation mechanism that, with a simple and direct switching structure, permits accurate switching operations for ON/OFF control of a cutter-driving electric motor.

In order to accomplish the above-mentioned object, the present invention provides an electric lawn mower of a type which generally comprises an electric motor mounted in a machine body section for driving a cutter blade, a handle extending rearward from the machine body section, and a switch operation mechanism provided on the handle for performing ON/OFF control of the electric motor. In the present invention, the switch operation mechanism includes a handling lever pivotally connected to a portion of the handle, a generally-fan-shaped actuating member pivotally connected at a pivot portion thereof to the handle in such a manner that the actuating member is pivotable in response to operation, by a human operator, of the handling lever, and a noncontact switch, preferably in the form of a noncontact reed switch, for turning on or off the electric motor in accordance with an ON/OFF state of the noncontact switch. The ON/OFF state of the noncontact switch is determined in accordance with pivoting movement, toward or away from the noncontact switch, of the actuating member responsive to the operation of the handling lever.

The noncontact switch, preferably in the form of a noncontact reed switch, is provided for turning on or off the electric motor in accordance with its ON/OFF state. To determine the ON/OFF state of the noncontact switch, the generally-fan-shaped actuating member is pivotally connected at its pivot portion to the handle in such a manner that the actuating member can pivot in response to operation, by the human operator, of the handling lever. Here, the noncontact switch is set to the ON or OFF state depending on whether the actuating member has pivoted away from or close to the noncontact switch.

Thus, even when the human operator has turned the handling lever through a relatively great angle, the fan-shaped actuating member can remain sufficiently near the noncontact switch, so that the noncontact switch can be kept reliably in the ON or OFF state; that is, the noncontact switch can perform a stable and reliable switching function. For example, if the fan-shaped actuating member is formed to have a large size, the setting range for the ON or OFF state of the noncontact switch can be increased sufficiently, which can thus achieve a higher degree of design flexibility or freedom. Further, by providing the noncontact switch and handling lever at a short distance from each other in the switch operation mechansim, a simple and direct switching structure for the ON/OFF control of the cutter-driving electric motor can be achieved.

Further, in the present invention, the switch operation mechanism may further include a clutch mechanism, provided between the handling lever and the actuating member, for bringing the handling lever and the actuating member into or out of engagement with each other in response to the operation of the handling lever. The provision of such a clutch mechanism can effectively prevent erroneous switching operations of the operation mechanism.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
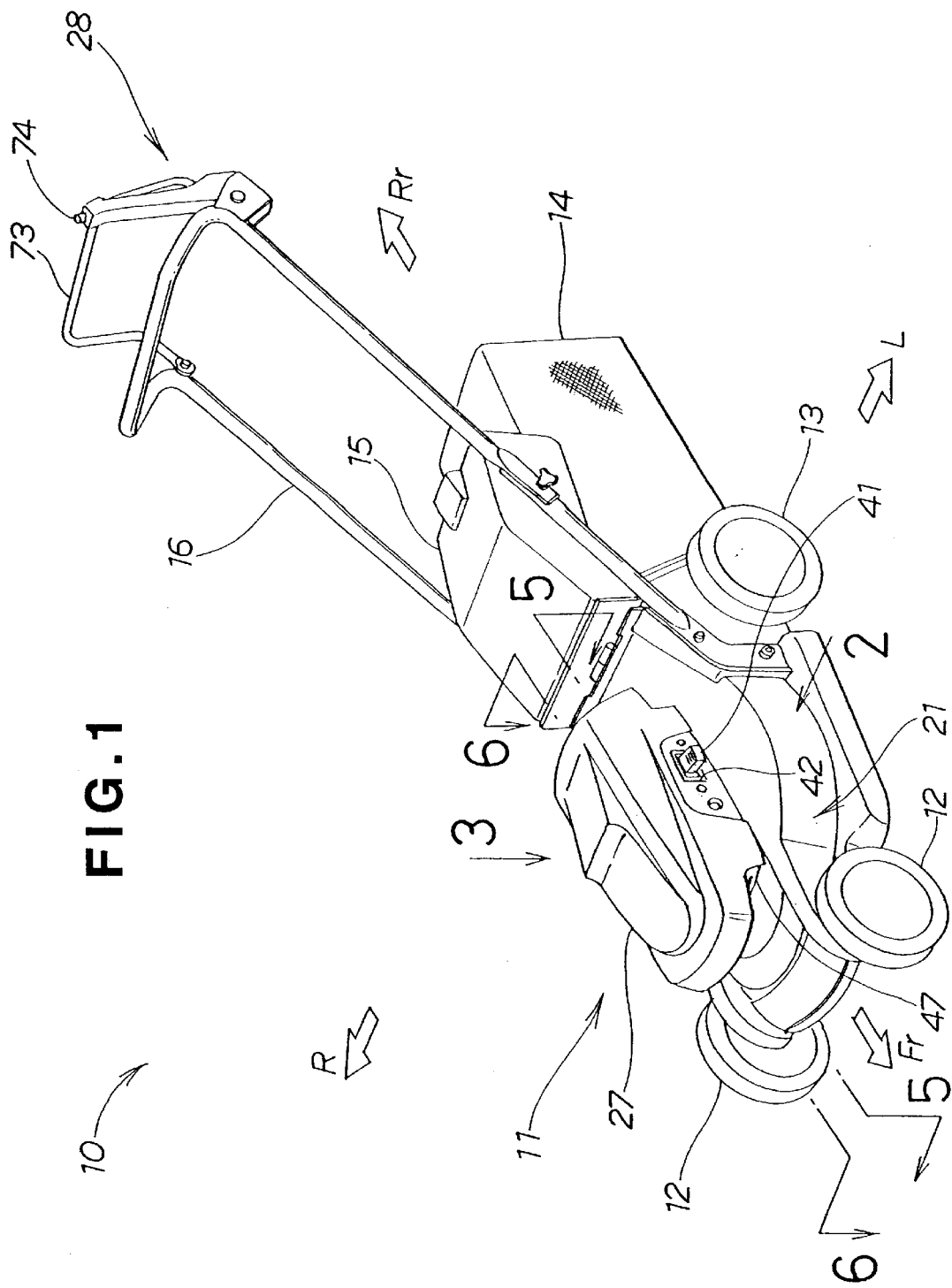
FIG. 1 is a perspective view of an electric lawn mower in accordance with an embodiment of the present invention.

In the following description, the terms "front", "rear", "left", "right", "upper" and "lower", etc. denote directions as viewed from a human operator. In the drawings, "Fr" indicates "front", "Rr" rear, "L" left, and "R" right.

FIG. 1 is a perspective view of an electric lawn mower in accordance with an embodiment of the present invention. The electric lawn mower 10 includes a machine body section 11, front wheels 12, rear wheels 13, a grass bag 14, a discharge port cover 15, a handle 16, a cutter housing 21, a covering 27, and a switch operation mechanism 28. The electric lawn mower 10 also includes a main key 41 that functions as a connecting member or male plug for insertion into a relay member 42 functioning as a female socket, for turning on/off the lawn mower 10. The switch operation mechanism 28 includes a noncontact reed switch 36 for performing ON/OFF control of an electric motor 22, a generally-fan-shaped actuating member 72 pivotally mounted on the handle 16 for determining an ON/OFF state of the reed switch 36, a handling lever 73 for causing the actuating member 72 to pivot and a clutch mechanism 74, as will be later described in detail.

Figure 2:
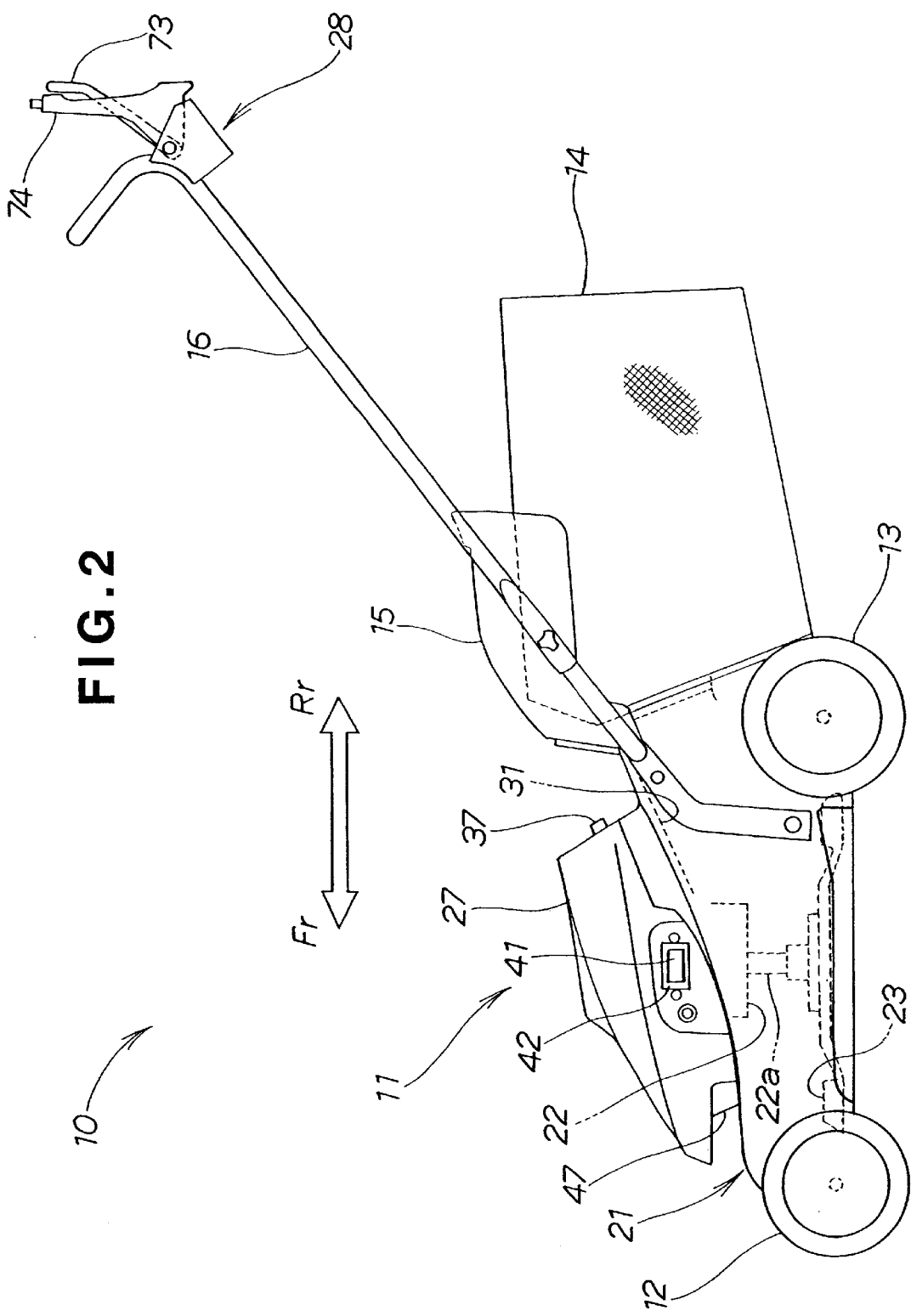
FIG. 2 is a side view of the electric lawn mower taken in a direction of arrow "2" of FIG. 1.

FIG. 2 is a side view of the electric lawn mower 10 taken in a direction of arrow "2" of FIG. 1. The electric lawn mower 10 is constructed as a rear-discharge type mower. Namely, the electric motor 22 is turned on or off by the main key 41 being inserted into or removed from the relay member 42 provided in the machine body section 11. The cutter blade 23 within the cutter housing 21 is rotated by the electric motor 22 to cut the grass, and resulting grass clippings are delivered, through a scroll portion 31 within the cutter housing 21, to a rear portion of the machine body section 11 so that the grass clippings are collected into the grass bag 14.

Figure 3:
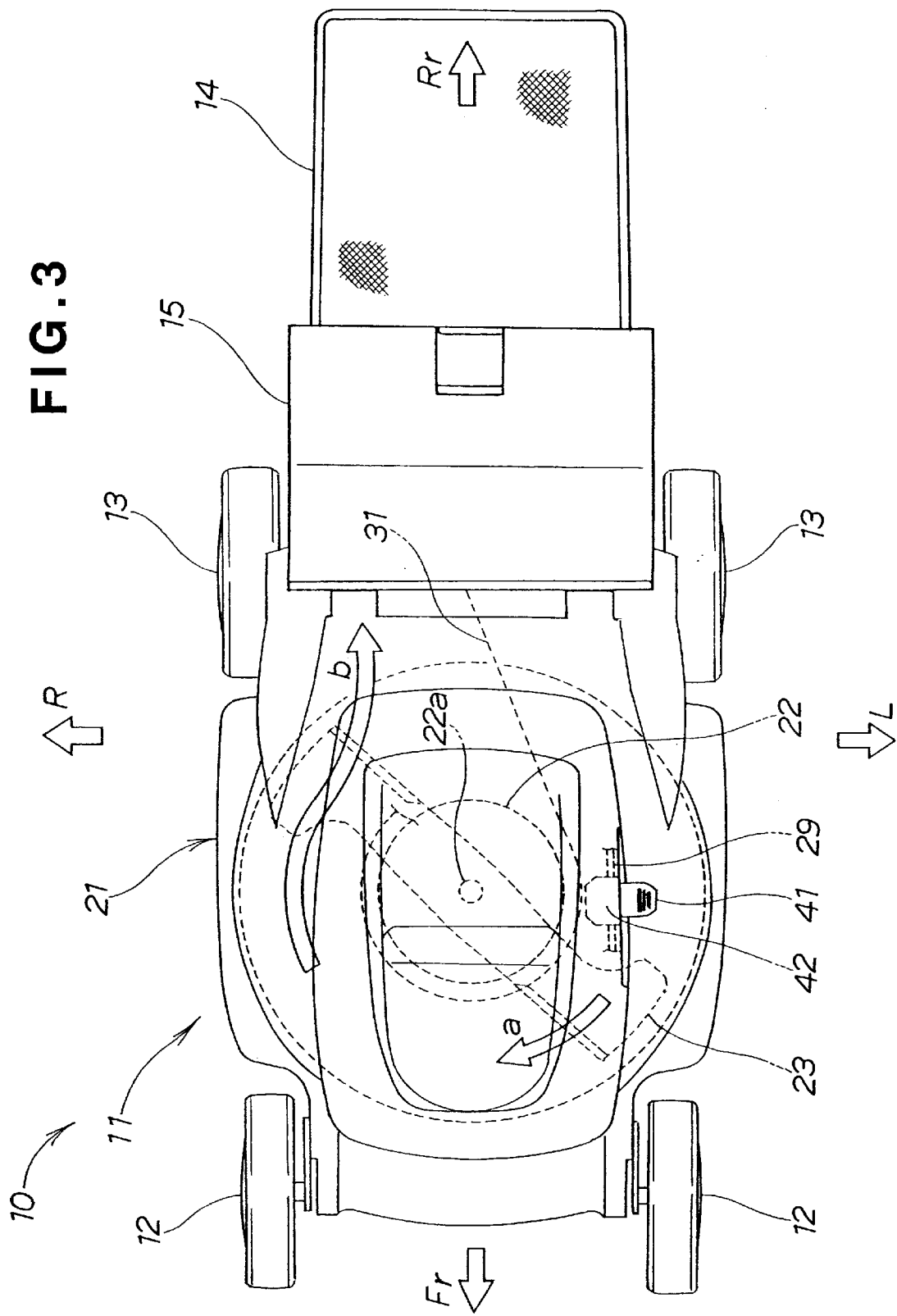
FIG. 3 is a plan view of the electric lawn mower taken in a direction of arrow "3" of FIG. 1.

FIG. 3 is a plan view of the electric lawn mower 10 taken in a direction of arrow "3" of FIG. 1. With the main key 41 inserted on the relay member 42, the electric motor 22 is turned on by the switch operation mechanism 28 shown in FIG. 1, so that the thus-activated motor 22 rotates the cutter blade 23 as denoted by arrow "a" to cut the grass. The resulting grass clippings are driven, by vortexes produced by the rotating cutter blade 23, into the grass bag 14 through the scroll portion 31 of the cutter housing, as denoted by arrow "b". Namely, in this rear-discharge-type electric lawn mower 10, the scroll portion 31 is disposed within one of the left or right side areas of the machine body section 11, and the relay member 42 is disposed in the other of the left or right side areas.

Generally, in the rear-discharge-type electric lawn mowers where grass clippings are delivered, through the scroll portion, to a rear portion of the machine body section to be ultimately collected into the grass bag, there arises a need to clean the scroll portion from time to time because the grass clippings tend to adhere to the surface of the scroll portion; thus, it is preferable that the electric lawn mowers be constructed in such a manner as to facilitate the cleaning of the scroll portion.

This is why the scroll portion 31 in the instant embodiment is disposed within one of the left or right side areas of the machine body section 11 while the relay member 42 is disposed in the other of the left or right side areas. With this arrangement, the human operator can easily clean the scroll portion 31 after he or she first pulls out the main key 41 from the relay member 42 on the other side of the body section 11 and then lays the machine body section 12 sideways with the one side facing upward. That is, the human operator can attend to the removal of the main key 41 and sideways laying of the machine body section 12 from a same operating position (without having to change the operating position from one side of the machine body section 11 to the other side), thereby enhancing the efficiency in the cleaning operations.

The following paragraphs detail the construction of the rear-discharge-type electric lawn mower 10.

Figure 4:
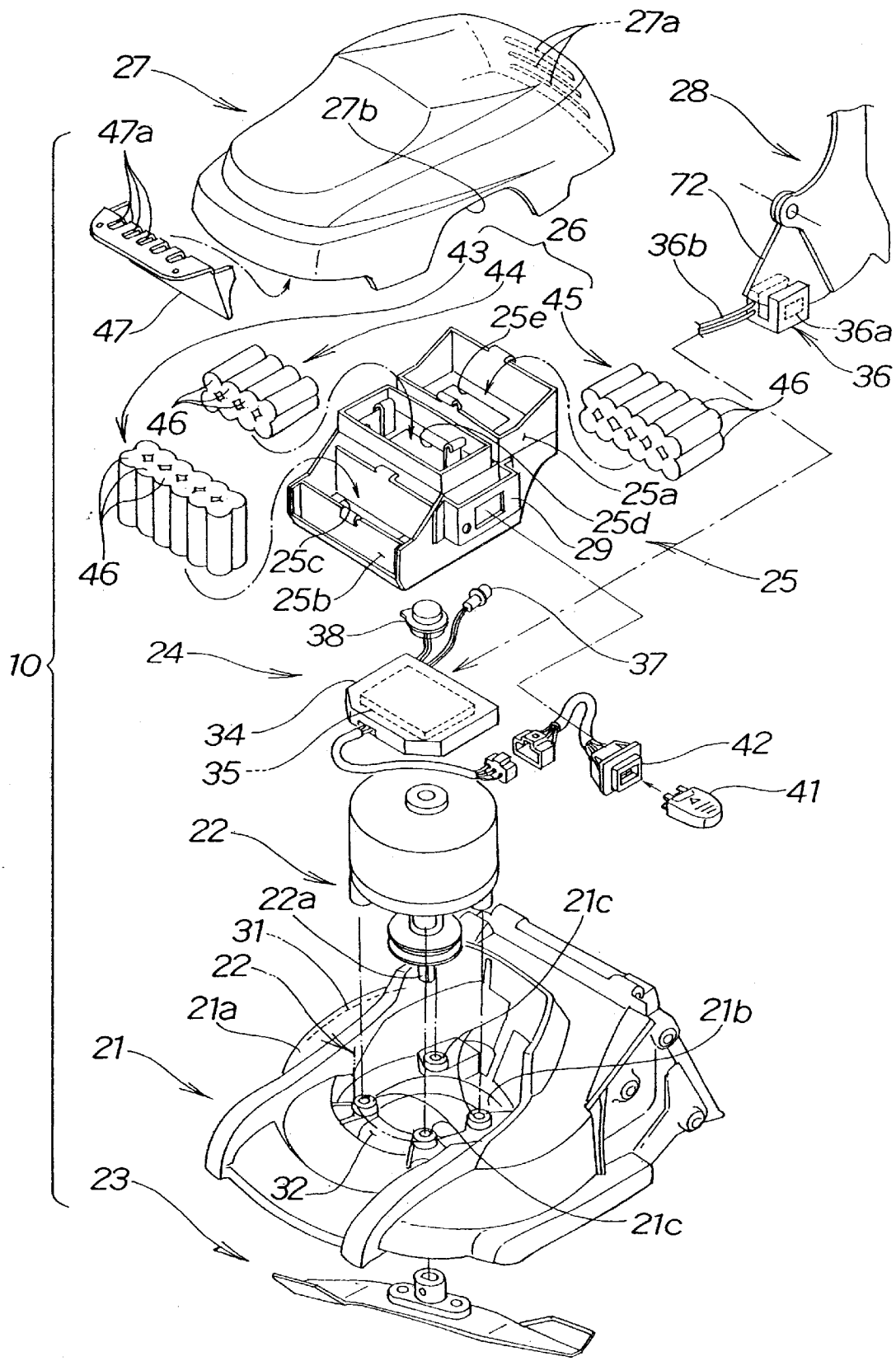
FIG. 4 is an exploded perspective view of the electric lawn mower.

FIG. 4 is an exploded perspective view of the electric lawn mower 10, which shows principal components of the lawn mower 10. As shown, the electric motor 22 is mounted on the cutter housing 21, the cutter blade 23 is connected to a rotation shaft 22a of the motor 22, and a control section 24 is disposed above the motor 22. The electric lawn mower 10 also includes a battery bracket 25 attached to the cutter housing 21 from above the motor 22 and control section 24, and a battery unit 26 supported on the battery bracket 25. The covering 27 collectively covers the electric motor 22, control section 24, battery bracket 25 and battery unit 26, and the electric motor 22 is controlled to be ON or OFF by the switch operation mechanism 28. Preferably, the battery bracket 25 is secured to the cutter housing 21 at the same time that the motor 22 is secured to the cutter housing 21.

The cutter housing 21 has a relatively large upward opening 21b receiving therein the motor 22, and a plurality of bosses 21c by which the motor 22 is fixed to the body 21a of the cutter housing 21. The housing body 21a has the scroll section 31 formed therein for delivering the grass clippings to the rear grass bag 14 while simultaneously permitting the rotation of the cutter blade 23. With the electric motor 22 mounted by means of the cutter housing bosses 21c, there are formed communicating holes 32 (only one of which is shown in FIG. 4) communicating between the interior and exterior of the cutter housing 21.

The control section 24 includes a casing 34 and a control board 35 accommodated in the casing 34. The control board 35 is coupled with the noncontact reed switch 36 that constitutes an important part of the switch operation mechanism 28 for controlling the motor 22. To the control board 35, there are also connected a display lamp 37 for being normally illuminated to inform the human operator that the electric lawn mower 10 is in operable condition, as well as a buzzer 38 that keeps sounding while the machine body section 11 is traveling or performing any of various operations. The control section 24 also includes the above-mentioned main key 41 and relay member 42 for powering on the lawn mower 10. Note that the relay member 42 functions also as a recharge connector for recharging the battery unit 26 as will be later described.

The battery bracket 25, which is made of a metal material, includes a body portion 25a that covers the sides and top of the electric motor 22, a forward extension 25b extending horizontally forward from the body portion 25a, and a mounting bracket 29 to which the relay member 42 is fitted. The battery bracket 25 is secured to the cutter housing 21 along with the motor 22, as stated earlier. The body portion 25a has air vents 25c and 25d, and the forward extension 25b has an air vent 25e.

As stated above, the electric lawnmower 10 of the present invention has the battery bracket 25 and electric motor 22 secured together to the cutter housing 21. By thus securing the battery bracket 25 and electric motor 22 together to the cutter housing 21, it is possible to assemble the electric lawn mower 10 with improved efficiency.

The battery unit 26, which is mounted on an upper portion of the cutter housing 21 and is preferably a nickel-cadmium battery unit, comprises a front battery 43 and first and second upper batteries 44 and 45. The front battery 43 comprises a group of electric cells 46 each having a rated voltage of 1.2 V and this front battery 43 is mounted on the forward extension 25b of the battery bracket 25 with each of the cells in an upright position. The first and second upper batteries 44 and 45 each comprises a group of electric cells 46 each having a rated voltage of 1.2 V similarly to the front battery 43, and these upper batteries 44 and 45 are mounted on the body portion 25b of the battery bracket 25 with each of the cells in an upright position.

The battery unit 26 may comprise other high-performance batteries than the nickel-cadmium batteries, such as other types of nickel- or lithium-based batteries. It is generally known that the temperature of the nickel- or lithium-based batteries can be controlled relatively easily during recharging operations. Thus, the battery unit 26 comprising such nickel- or lithium-based batteries can be recharged with significantly improved efficiency.

The covering 27, which is preferably made of resin, includes a louver 47 provided on its lower front portion and having openings 47a for air currents to and from the interior of the covering 27. The covering 27 also has air vents 27a formed in its rear end portion and a recess 27b in its left side for allowing the relay member 42 to open to the outside.

Figure 5:
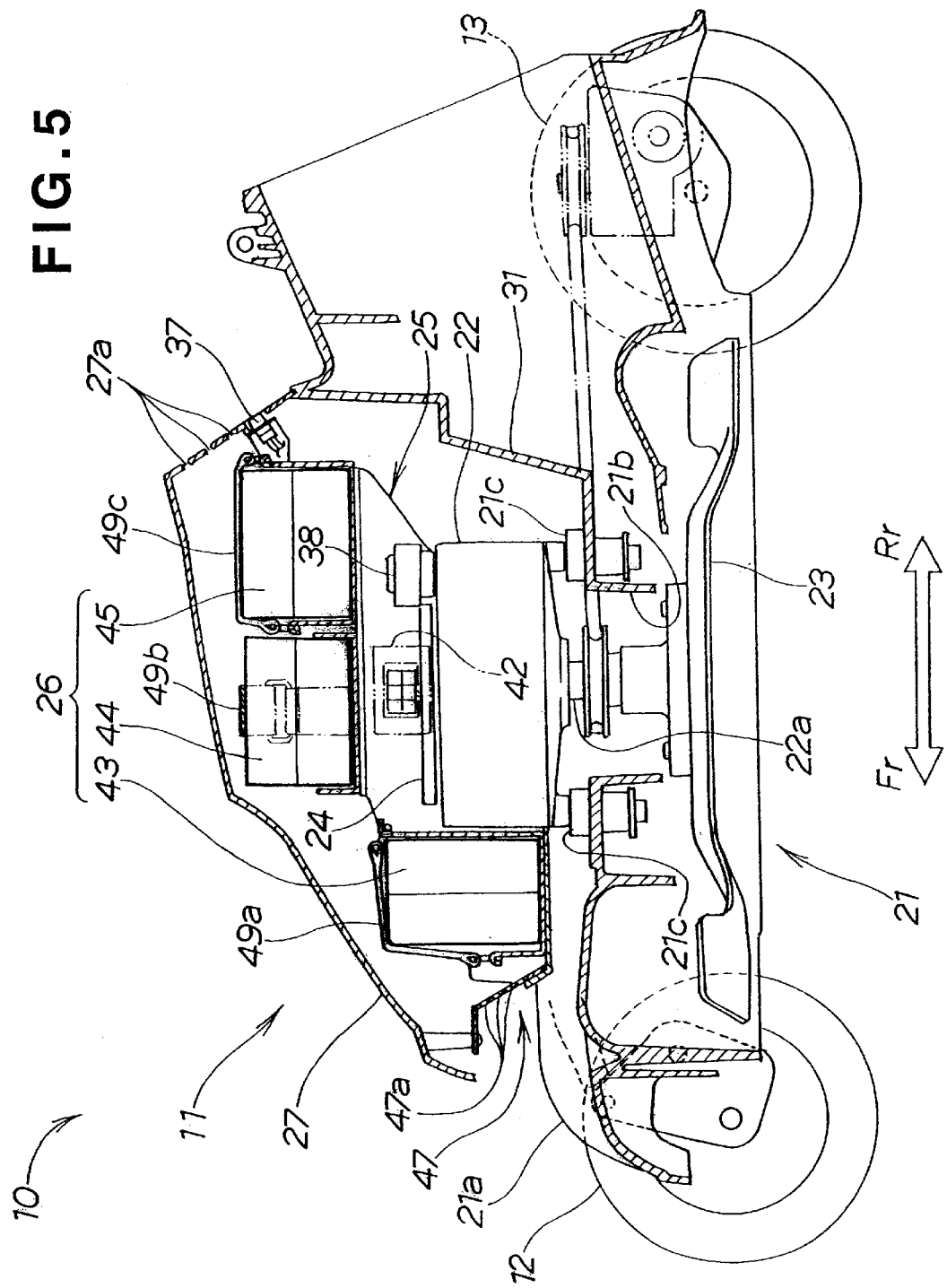
FIG. 5 is a sectional side view of the electric lawn mower taken along the 5—5 line of FIG. 1.

FIG. 5 is a sectional side view of the electric lawn mower 10 taken alone the 5—5 line of FIG. 1. FIG. 5 clearly shows that, in the electric lawn mower 10 where the cutter blade 23 is enclosed in the cutter housing 21, the electric motor 22 is mounted on the upper portion of the cutter housing 21 and the motor 22 is driven via the rechargeable battery unit 26, the battery unit 26 comprises the first and second upper batteries 44 and 45 positioned above the motor 22 and the front battery 43 positioned in front of the motor 22. With the batteries 44 and 45 positioned above the motor 22 and the battery 43 positioned in front of the motor 22, it is possible to achieve appropriate weight balance of the electric lawn mower 10, which can thereby improve operability of the electric lawn mower 10.

Further, in the electric lawn mower 10 where the rechargeable battery unit 26 is mounted in the machine body section 11 for driving the electric motor 22 to rotate the cutter blade 23 within the cutter housing 21, the motor 22 and battery unit 26 are covered collectively with the covering 27, the covering 27 has a front half portion shaped to progressively slant upward in the front-to-rear direction of the mower 10, the louver openings 47a formed in its lower front, and the air vents 27a formed in its upper rear. Thus, the battery unit 26 and motor 22 can be cooled by external cool air being introduced into the covering 27 through the front louver openings 47a and discharged out of the covering 27 through the rear air vents 27a. This arrangement can effectively prevent the battery unit 26 and motor 22 from overheating, which thereby allows the electric lawn mower 10 to withstand long-time continuous operation.

Figure 6:
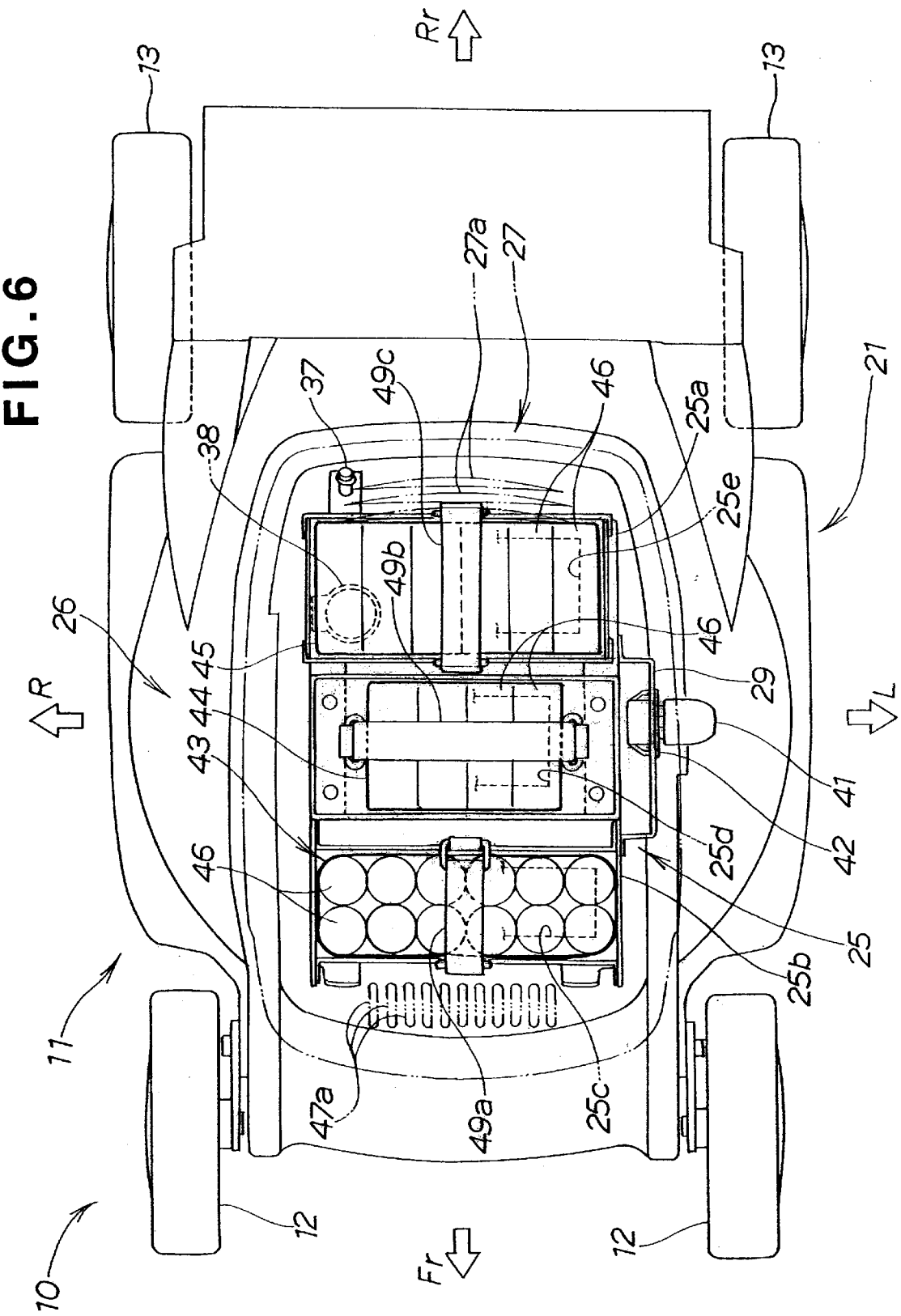
FIG. 6 is a sectional view of the electric lawn mower taken along the 6—6 line of FIG. 1.

FIG. 6 is a sectional view of the electric lawn mower 10 taken alone the 6—6 line of FIG. 1, which shows the mower 10 with the covering 27 (see FIG. 5) removed. This figure clearly shows that the cutter housing 21 has fixed thereto the battery bracket 25 including the body portion 25a covering the sides and top of the electric motor 22 and the forward extension 25b extending forward from the body portion 25a, and that the first and second upper batteries 44 and 45 and the front battery 43 are mounted on the body portion 25a and extension 25b, respectively, in a distributed fashion. Such distributed arrangement of the batteries 43, 44 and 45 allows cool air to easily flow among the batteries 43, 44 and 45 and electric motor 22, and thereby promotes heat radiation from the batteries 43, 44 and 45 and motor 22.

Further, because the battery bracket 25 is made of a metal material and has the air vents 25c, 25d and 25e formed where the batteries 43, 44 and 45 are mounted, it is possible to further promote heat radiation from the batteries 43, 44 and 45 and motor 22. Note that reference numerals 49a, 49b and 49c represent elastic belts that fasten the front and side batteries 43, 44 and 45 to the battery bracket 25.

Figure 7:
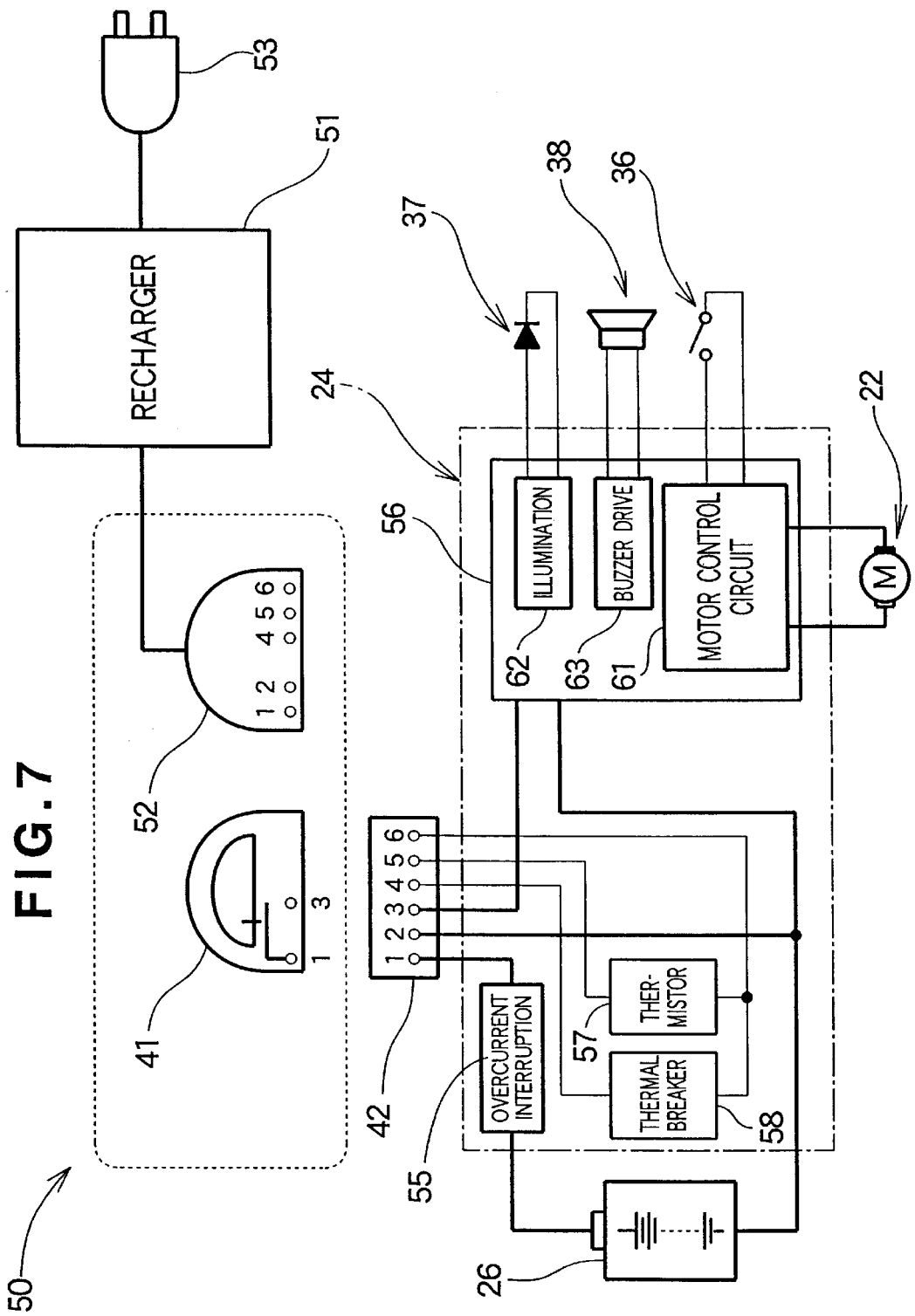
FIG. 7 is a hardware block diagram showing a control system of the electric lawn mower.

FIG. 7 is a block diagram showing a control system of the electric lawn mower 10 described above in relation to FIGS. 1–6. The control system 50 generally comprises the above-described control section 24 for controlling the electric motor 22, and a recharger 51 for recharging the battery unit 26.

As shown in FIG. 7, the control section 24 includes an overcurrent interruption circuit 55 for interrupting an overcurrent, a control block 56 for controlling the operation of the electric lawn mower 10, a thermistor 57 for monitoring the temperature of the battery terminating the recharge on the basis of an output signal from unit 26 during the recharge, and a thermal breaker 58 for the thermistor. The control section 24 also includes the above-described relay member 42 into which either the main key 41 or the plug of the recharger 51 can be inserted as necessary.

The control section 24 constantly monitors, via the thermistor 57, the temperature of the battery unit 26 during the recharge; namely, the control section 24 has a function of managing and controlling the temperature of the battery unit 26. By the control section 24 having the battery-temperature managing/controlling function, the battery unit 26 can be recharged with enhanced reliability, as a result of which the battery unit 26 can have prolonged operating life.

The control block 56 includes a motor control circuit 61 for controlling operation of the electric motor 22, an illumination circuit 62 for illuminating the above-mentioned display lamp 37 preferably in the form of a light-emitting diode (LED), and a buzzer drive circuit for driving the buzzer 38. To the motor control circuit 61 is connected the noncontact reed switch 36 of the switch operation mechanism 28 (FIG. 4) for turning on/off the electric motor 22. The illumination circuit 62 keeps illuminating the display lamp 37 while the voltage of the battery unit 26 is higher than a predetermined voltage level immediately above a later-described memory-effect inducing voltage level, but deilluminates (turns off) the display lamp 37 once the voltage of the battery unit 26 falls below the predetermined voltage level. Specifically, the illumination circuit 62 keeps illuminating the display lamp 37 except when the voltage of the battery unit 26 is lower than the predetermined voltage level of, for example, 0.97 volts/cell.

With the provision of the display lamp 37 kept illuminated while the voltage of the battery unit 26 is exceeding the predetermined voltage level immediately above the memory-effect inducing voltage level, the human operator may continue mowing while the display lamp 37 is being illuminated and stop mowing once the display lamp 37 is turned off. Namely, the display lamp 37 can inform the human operator of appropriate timing to recharge the battery unit 26. As a consequence, it is possible to prevent the operating life of the battery unit 26 from being improperly shortened.

The buzzer drive circuit 63 causes the buzzer 38 to keep sounding while the electric motor 22 is rotating, but to stop sounding once the voltage of the battery unit 26 falls below a predetermined voltage level. Namely, in the electric lawn mower 10 of the invention which includes the rechargeable battery unit 26 mounted in the machine body section 11 and which causes the machine body section 11 to travel and perform any of various other operations using the battery unit 26 as the driving source, the buzzer 38 can inform the human operator that the electric lawn mower 10 is currently in the actual operating state.

Generally, the motor-driven electric lawn mowers can operate with noise much lower than the engine-driven lawn mowers. Thus, where such an electric lawn mower is used in a great-noise environment, a human operator may not be able to easily judge, through his or her hearing, whether or not the electric lawn mower is currently in the actual operating state. Thus, with the buzzer 38 that keeps sounding while the electric motor 22 is rotating to cause the machine body section 11 to travel or perform any of various other operations and thereby informs the human operator that the electric lawn mower 10 is currently in the actual operating state, the working efficiency and operability of the lawn mower 10 can be improved.

Further, because the buzzer 38 is automatically deactivated when the voltage of the battery unit 26 falls below the predetermined voltage level, it is possible to avoid wasteful power consumption of the battery unit 26.

The relay member 42 is a connector having six connection terminals C1–C6 (denoted simply as "1"–"6" in the figure due to a limited space), of which the first connection terminal C1 functioning as a positive polarity terminal is connected to the positive pole of the battery unit 26 via the overcurrent interruption circuit 55, the second connection terminal C2 connected to the negative pole of the battery unit 26 and one of two output terminals of the control block 56, the third connection terminal C3 connected to the other output terminal of the control block 56, the fourth connection terminal C4 connected to an output terminal of the thermal breaker 58, the fifth connection terminal C5 connected to an output terminal of the thermistor 57 and the sixth connection terminal C6 connected to the respective input terminals of the thermal breaker 58 and thermistor 57.

The main key 41 is in the form of a plug having a pair of electrically connected pins P1 and P3 (denoted simply as "1" and "3" in the figure due to a limited space), which are inserted into and connected to the first and third connection terminals C1 and C3, respectively, of the relay member 42 to thereby short-circuit between the terminals C1 and C3.

The recharger 51 includes the recharging plug 52 for connection to the relay member 42 and a power supply plug 53 for connection to the AC line. The recharging plug 52 has six pins R1–R6 (denoted simply as "1"–"6" in the figure due to a limited space) for connection to the first to sixth connection terminals C1–C6, respectively, of the relay member 42.

From the foregoing, it should be apparent that the relay member 42 is a connector to which either the main key 41 or the recharging plug 52 of the recharger 51 is connectable as necessary. In other words, the relay member 42 in the electric lawn mower 10 of the invention is constructed in such a manner that the relay member 42 alone is connectable with the recharger 51 for recharging the battery unit 26 as well as with the main key 41. Specifically, the main key 41 can be inserted and connected to the relay member 42 when the electric lawn mower 10 is to operate for the grass cutting purposes, while the recharger 51 can be inserted and connected to the relay member 42 when the battery unit 26 is to be recharged. As a result, the electric lawn mower 10 can work with increased convenience and efficiency at the time of the discharge (i.e., grass cutting operations) or recharge of the battery unit 26.

More specifically, in the electric lawn mower 10, the positive-polarity connection terminal C1 of the relay member 42, which is directly connectable with the positive pole of the battery unit 26, also functions as a recharging positive-polarity terminal connectable, via the recharger 51, with the positive pole of the battery unit 26. With the positive-polarity connection terminal C1 of the relay member 42 thus functioning also as the recharging positive-polarity terminal, it is possible to simplify the construction of the control section 24 and relay member 42. As a result, the necessary overall cost of the electric lawn mower 10 can be reduced to a considerable degree.

Further, in the electric lawn mower 10 of the invention which includes the rechargeable battery unit 26 mounted in the machine body section 11 and which causes the machine body section 11 to travel and perform any of various other operations using the battery unit 26 as the driving source, the relay member 42 is provided for operative connection between the control section 24 and the battery unit 26, and the connecting member (main key) 41 is inserted into the relay member 42 to operatively connect the control section 24 and battery unit 26. Further, removing the connecting member (main key) 41 from the relay member 42 can completely disconnect the control section 24 from the battery unit 26. Such an arrangement can minimize unnecessary electrical discharge from the battery unit 26 in a non-operating state of the electric lawn mower 10, and prevent over discharge during long-term storage of the electric lawn mower 10. As a result, the battery unit 26 can have even longer operating life.

Figure 8:
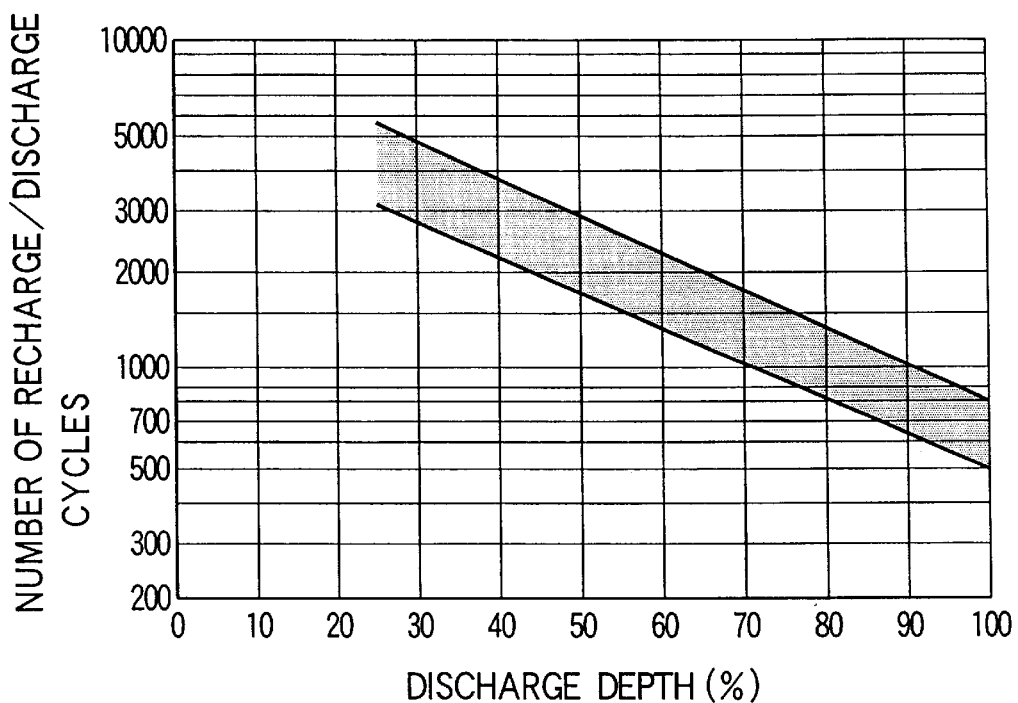
FIG. 8 is a graph explanatory of operating life characteristics of a battery unit employed in the electric lawn mower of the present invention.

FIG. 8 is a graph explanatory of operating life characteristics of the battery unit 26 employed in the electric lawn mower 10 of the invention, where the horizontal axis represent a variation in the discharge depth (%) while the vertical axis represents a variation in the number of recharge/discharge cycles. Here, the "discharge depth" means a depth or degree of electrical discharge from the battery unit 26 and is expressed by the percentage; let it be assume that when the battery unit 26 having a capacity of "100" is completely discharged, the discharge depth (degree or extent of discharge) is expressed as "100%". The "number of recharge/discharge cycles" means a total number of times the battery unit 26 can be recharged and discharged. As known in the art, the nickel-cadmium battery can restore the capacity even after it is completely discharged and is thus more tolerant of overdischarge than lead-based or other types of batteries. However, repetition of complete discharge would lead to shortened operating life of the battery. For example, if the complete discharge is repeated, the number of recharge/discharge cycles is limited to a range of 500 to 800, while if 50% discharge is repeated, the number of recharge/discharge cycles can increase up to a range of 1,700 to 1,800, as shown in FIG. 8.

Figure 9:
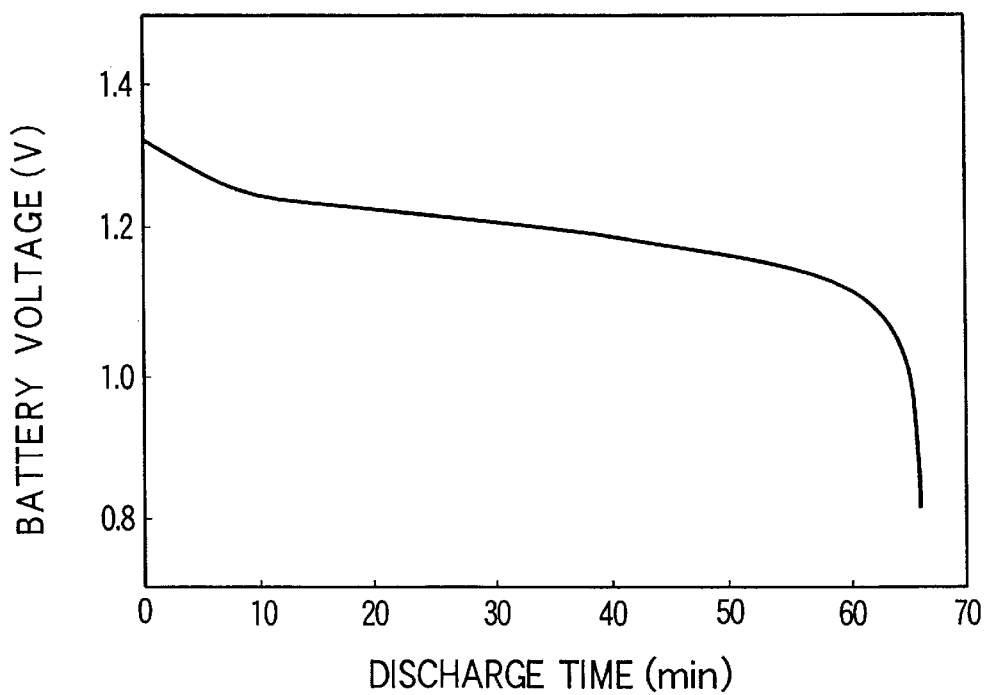
FIG. 9 is a graph explanatory of a memory effect of the battery unit in the electric lawn mower of the invention.

FIG. 9 is a graph explanatory of the memory effect of the battery unit 26 employed in the electric lawn mower 10 of the invention, where the horizontal axis represents a variation in the discharge time (min.) while the vertical axis represents a variation in the battery voltage (V). As known in the art, if deep discharge is effected after repetition of shallow discharge, the nickel-cadmium battery presents two-stage voltage drops during the deep discharge, and such a phenomenon is referred to as the memory effect. The battery voltage falls slowly from 1.3 V to 1.1 V for a first 60 min. from the beginning of the discharge. However, after the first 60 min. elapses, there occurs a rapid drop in the battery voltage.

From the graphs of FIGS. 8 and 9, it can be seen that care must be taken 1) to not repeat complete discharge and 2) to not repeat only shallow discharge that tends to cause the memory effect. Having empirically estimated that the memory-effect inducing voltage level is 1.1 V/cell in the case of the battery unit 26 having the rated voltage of 1.2 V, the electric lawn mower 10 of the invention is provided with the display lamp 37 (FIG. 5) that is kept illuminated until the battery voltage drops below 9.7 Volts/cell with a view to setting the memory-effect inducing voltage level to less than 1.1 Volts/cell.

Namely, the electric lawn mower 10 is provided with such a display lamp 37 that is kept illuminated as long as the voltage of the battery unit 26 exceeds the predetermined voltage level immediately above the memory-effect inducing voltage level. With the thus-operating display lamp 37, it is possible to properly indicate to the human operator when the battery unit 26 is to be recharged, to thereby prevent the operating life of the battery unit 26 from being shortened due to improper recharge.

The following paragraphs describe an example of a heat radiation mechanism employed in the above-described electric lawn mower 10.

Figure 10A:
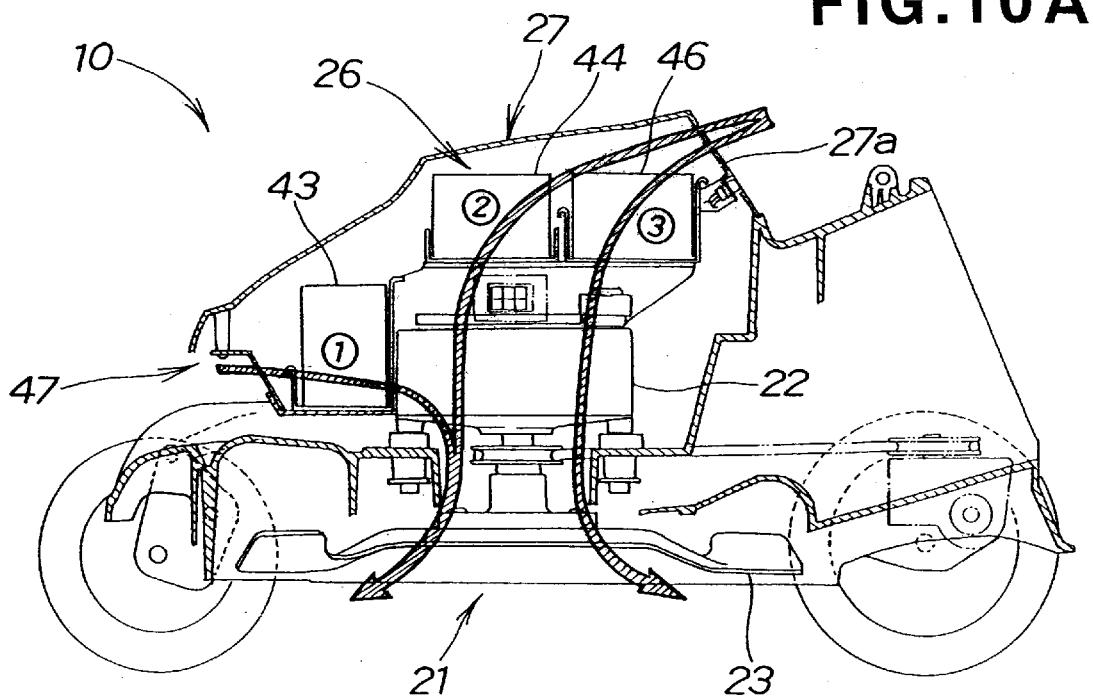
FIGS. 10A and 10B are views explanatory of behavior of the electric lawn mower of the invention.
Figure 10B:
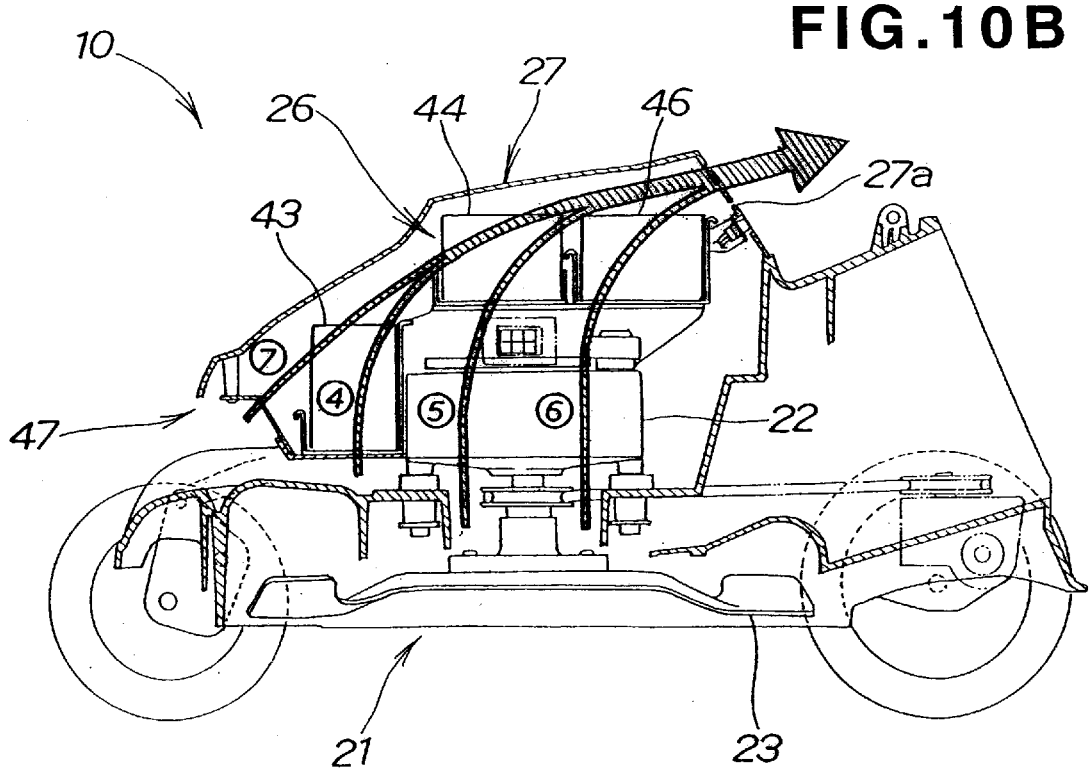

FIGS. 10A and 10B are views explanatory of behavior of the electric lawn mower 10, of which FIG. 10A shows flows of air through the lawn mower 10 while the lawn mower 10 is actually operating and FIG. 10B shows flows of air through the lawn mower 10 immediately after the operation of the lawn mower 10 has been terminated. When the lawn mower 10 is in operation as shown in FIG. 10A, the rotating cutter blade 23 produces a negative pressure within the cutter housing 21. Thus, external air is drawn in through the louver openings 47a (FIG. 4), passes along sides of the front battery 43 and flows into the cutter housing 21 through the communicating holes 32 (FIG. 4) formed beneath the motor 22, as denoted by arrow 1. In the meantime, external air is drawn in through the air vents 27a of the covering 27, passes along sides of the first and second upper batteries 44 and 45 and flows into the cutter housing 21 through the communicating holes 21, as denoted by arrow 2 and arrow 3. The air flows indicated by arrows 1–3 can compulsorily cool the front battery 43, first and second upper batteries 44 and 45 and electric motor 22.

When the electric lawn mower 10 has been deactivated as shown in FIG. 10B, the front battery 43, first and second upper batteries 44 and 45 and electric motor 22 are in considerably heated condition. The heat can be radiated from the batteries 43, 44 and 45 and motor 22 by natural convection of the air introduced through the communicating holes 32 and passing around the batteries 43, 44 and 45 and motor 22 as denoted by arrows 4̂-Ĝ. Such air flows may cause other external air to be drawn in through the louver openings 47a, pass around the batteries 43, 44 and 45 and motor 22 and escape through the air vents 27a of the covering 27 along with the other air flows, as denoted by arrow 7̂, so that further heat radiation of the batteries 43, 44 and 45 and motor 22 can be promoted.

Namely, in the electric lawn mower 10 where the cutter housing 21 has the communicating holes 32 communicating with the interior space defined by the covering 27, the rotating cutter blade 23 produces air flows from the louver openings 47a and air vents 27a. When the cutter blade 23 is not rotating, on the other hand, reverse air flows are produced from within the cutter housing 21 to the air vents 27a by the heat of the batteries 43, 44 and 45 and motor 22.

Figure 11:
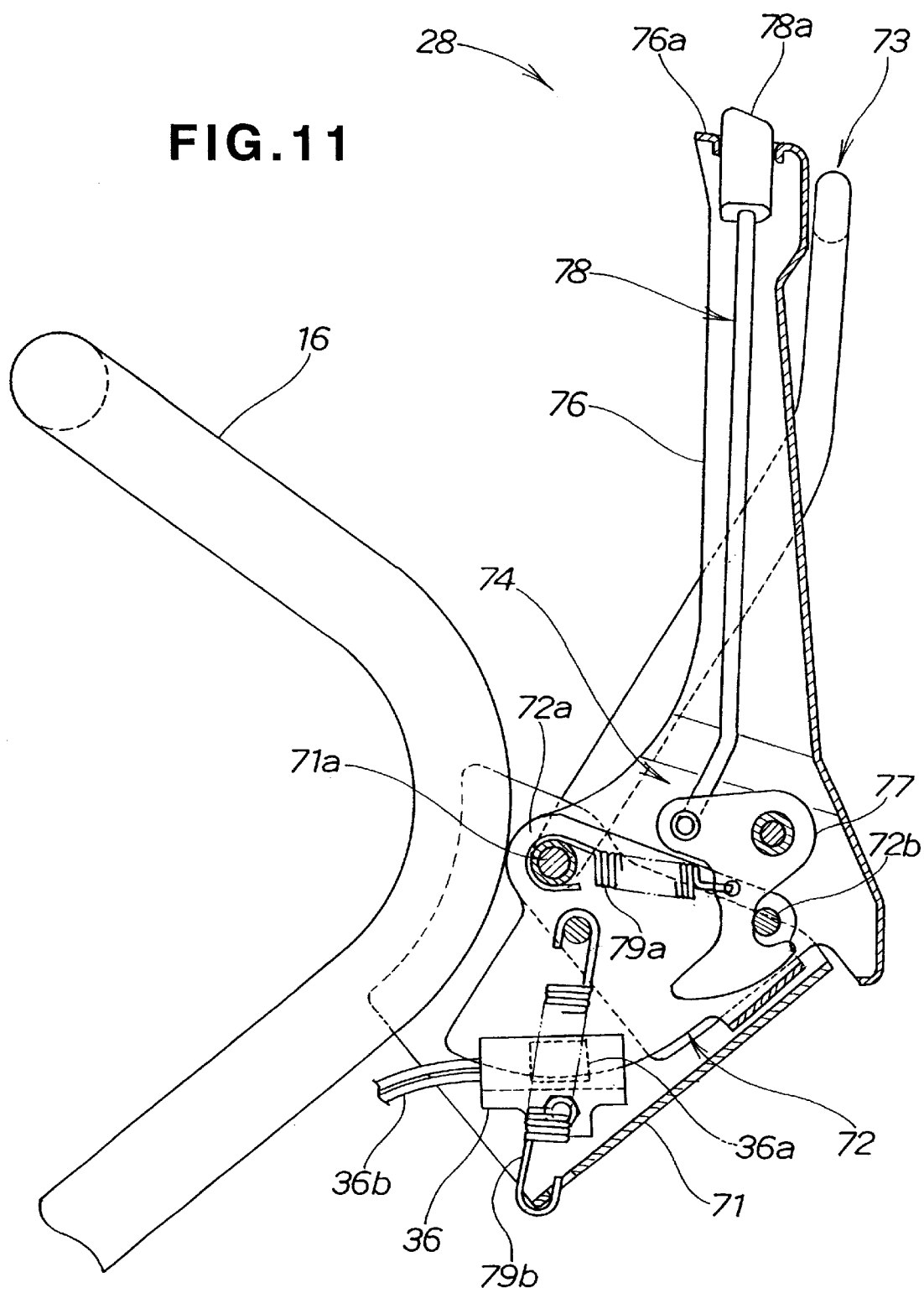
FIG. 11 is a sectional side view of a switch operation mechanism in the electric lawn mower of the invention.

FIG. 11 is a sectional side view of the switch operation mechanism 28 in the electric lawn mower 10 of the invention.

The switch operation mechanism 28 is provided on a left end portion of the handle 16 for the human operator to turn on/off the electric motor 22 (see FIG. 2). The switch operation mechanism 28 includes a bracket 71 secured to the left end portion of the handle 16, the noncontact reed switch 36 fixed to the bracket 71, and the fan-shaped actuating member 72 that is pivotally connected at its pivot portion 72a to the bracket 71 and functions to determine the ON/OFF state of the reed switch 36. The actuating member 72 is made of a magnetic material, such as an iron-based material. The switch operation mechanism 28 also includes the handling lever or bail bar 73 for causing the actuating member 72 to pivot, and the clutch mechansim 74 for bringing the handling lever or bail bar 73 and actuating member 72 into or out of engagement with each other. Reference numeral 71a represents a support pin fixed to or integrally formed on the bracket 71, about which the actuating member 72 can pivot relative to the bracket 71.

The noncontact reed switch 36 has a magnet 36a and is set to the ON or OFF state in accordance with a variation in magnetic flux that is caused by the actuating member 72 moving toward or away from the magnet 36a. Reference numeral 36b in FIG. 11 represents a harness for connecting the reed switch 36 with the control section 24 (see FIG. 4). The handling lever or bail bar 73 (hereinafter referred to simply as handling lever) is a generally U-shaped lever, which has a left end pivotally connected via the bracket 71 to an upper left end portion of the handle 16 and has a right end pivotally to an upper right end portion of the handle 16.

The clutch mechanism 74 includes a lever member 76 pivotally connected to the bracket 71 and connected to the same shaft as the handling lever 73, a hook member 77 pivotally connected to the lever member 76, and a hook driving rod 78 having one end pivotally connected to the hook member 77 and the other end slid ably coupled to a distal end 76a of the lever member 76. The clutch mechanism 74 also includes a tension spring 79a connecting between the hook member 77 and the support pin 71a, an engaging pin 72b provided on the actuating member 72, and a tension spring 79b connecting between the actuating member 72 and the bracket 71. Reference numeral 78a represents a knob of the hook driving rod 78.

Figure 12:
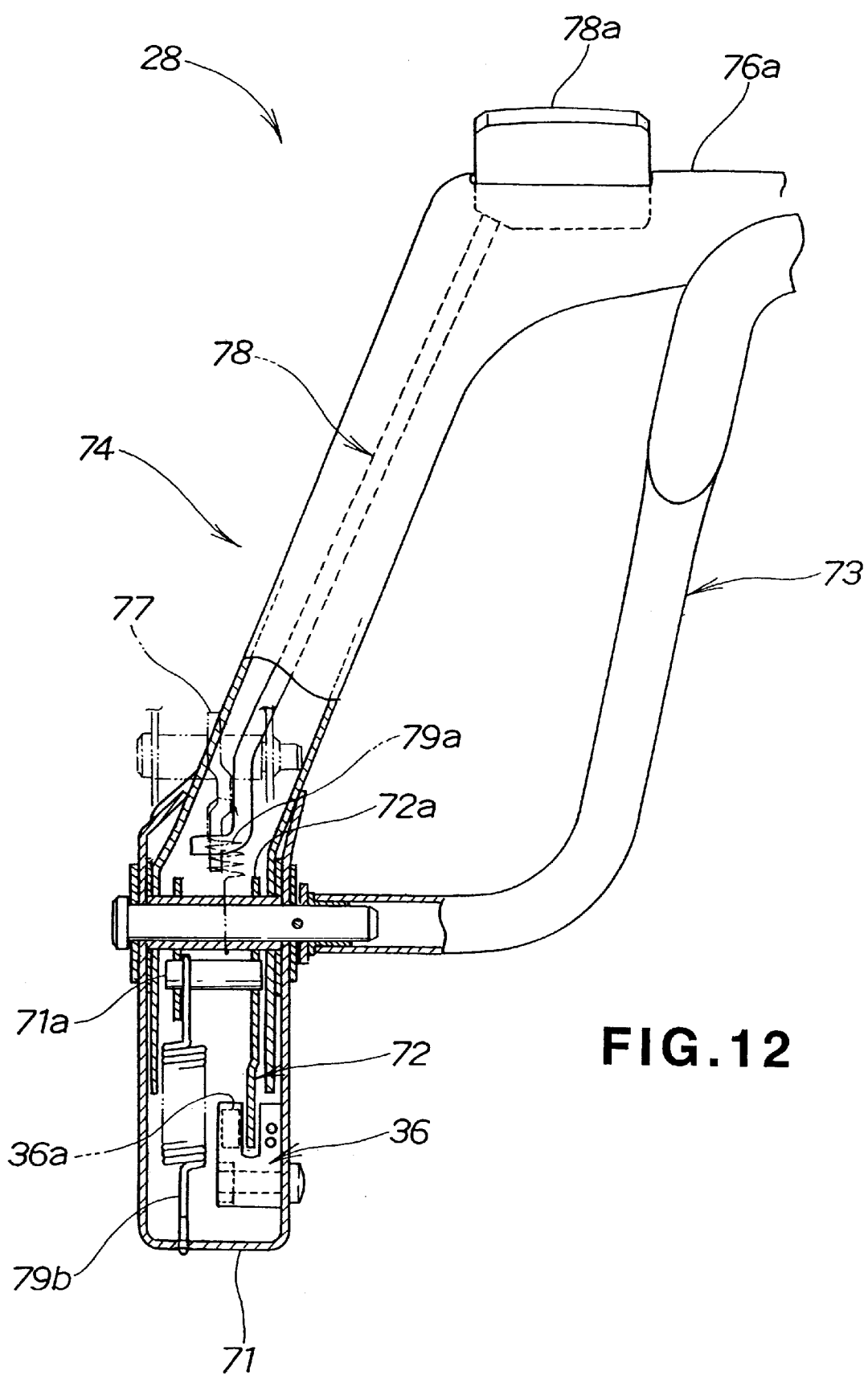
FIG. 12 is a sectional front view of the switch operation mechanism in the electric lawn mower of the invention.

FIG. 12 is a sectional front view of the switch operation mechanism 28 in the electric lawn mower 10 of the invention. As clearly seen here, in the electric lawn mower 10 where the electric motor 22 is mounted in the machine body section 11 to drive the cutter blade 23, the handle 16 extends rearward from the machine body section 11 (see FIG. 1) and the switch operation mechanism 28 for turning on or off the motor 22 is mounted on the handle 16, the switch operation mechanism 28 includes the noncontact reed switch 36 for performing ON/OFF control of the motor 22, the fan-shaped actuating member 72 having its pivot portion 72a pivotally connected to the handle 16 for setting the ON/OFF state of the reed switch 36, and the handling lever 73 for causing the actuating member 72 to pivot about the support pin 71a. Specifically, the reed switch 36 is set to the ON/OFF state, depending on whether the actuating member 72 is moved close to or away from the reed switch 36.

Even when the human operator has turned the handling lever 73 through a relatively great angle, the fan-shaped or arc-shaped actuating member 72 can remain sufficiently near the reed switch 36, so that the noncontact reed switch 36 can be kept reliably in the ON or OFF state; that is, the reed switch 36 can perform a stable and reliable switching function. For example, if the fan-shaped actuating member 72 is forced to have a large size, the setting range for the ON or OFF state of the switch 36 can be increased, which can achieve a higher degree of designing flexibility or freedom. Further, providing the noncontact reed switch 36 and handling lever 7 at a short distance from each other in the switch operation mechanism 28, a simple and direct switching structure for the ON/OFF control of the cutter-driving electric motor can be achieved.

Furthermore, with the clutch mechanism 74 provided between the handling lever 73 and the actuating member 72 for bringing these components 73 and 72 into or out of engagement with each other, it is possible to prevent erroneous ON/OFF switching operations of the switch operation mechanism 28, and thus the operability and reliability of the electric lawn mower 10 can be enhanced.

Operation of the above-described switch operation mechanism 28 is described below, with reference to FIGS. 13A to 13C.

Figures 13A, 13B, 13C:
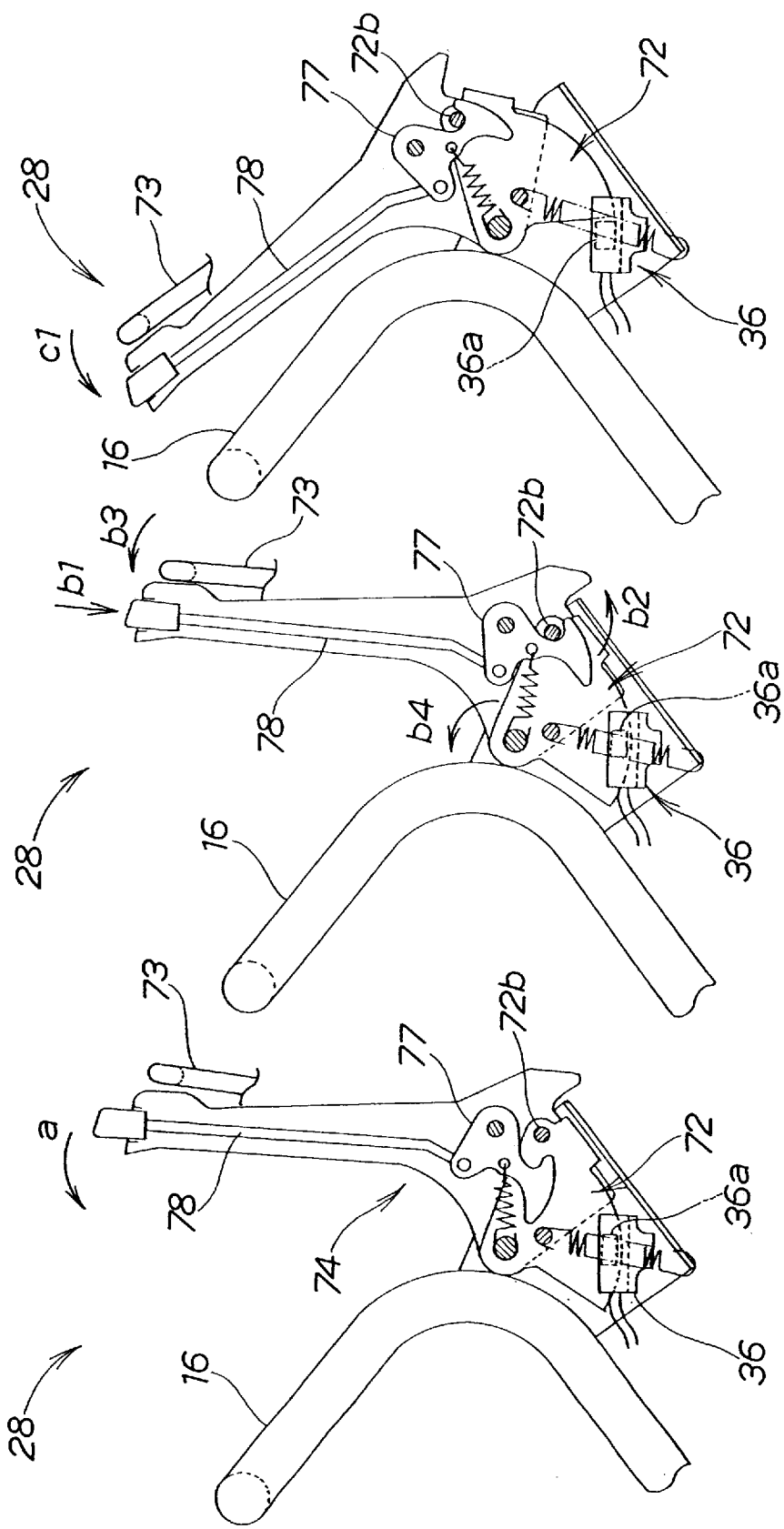
FIGS. 13A–13C are views explanatory of behavior of the switch operation mechanism.

FIG. 13A shows the switch operation mechanism 28 before the electric motor 22 is activated. In the illustrated example, the noncontact reed switch 36 is in the OFF state with the actuating member 72 held close to the magnet 36a of the reed switch 36. Further, the clutch mechanism 74 is in a non-clutching state where the hook member 77 is not engaging the engaging pin 72b of the actuating member 72, so that the actuating member 72 will not pivot even if the handling lever 73 is turned in an arrow "a" direction. Namely, the electric motor 22 does not rotate unless the reed switch 36 is changed from the OFF state to the ON state.

FIG. 13B shows that as the hook driving rod 78 is depressed as denoted by arrow "b1", the hook member 77 pivots to engage with the engaging pin 72b of the actuating member 72 as denoted by arrow "b2". Then, the handling lever 73 is turned along with the lever member 76 as denoted by arrow "b3", so that the actuating member 72 pivots as denoted by arrow "b4". However, even after the actuating member 72 has pivoted like this, the actuating member 72 is still located close to the magnet 36a of the noncontact reed switch 36, and thus the reed switch 36 remains in the OFF state.

Then as shown in FIG. 13C, the handling lever 73 is further turned as denoted by arrow "c1", which causes the actuating member 72 to pivot away from the magnet 36a of the reed switch 36. Thus, the reed switch 36 is set to the ON state, in response to which the rotation of the electric motor 22 is initiated. As can be appreciated from FIGS. 13A–13C, the fan- or arc-shaped actuating member 72 coacts with the noncontact reed switch 36 to maintain the switch 36 in the OFF state during a major portion of the movement of the actuating member 72 from the normal OFF state (FIG. 13A) to the ON state (FIG. 13C).

It should be appreciated that although the instant embodiment has been described above in relation to the noncontact reed switch 36 provided with the magnet 36a, the present invention is not so limited; the noncontact reed switch 36 may be replaced with any other suitable noncontact switch such as a photocoupler comprising a combination of light-emitting and light-receiving elements.

In summary, the present invention is characterized in that the generally fan-shaped or arc-shaped actuating member is pivotally connected at its pivot portion to the handle in such a manner that the actuating member is pivotable in response to manual operation, by the human operator, of the handling lever (bail bar) and the noncontact switch is provided for tuning on or off the electric motor in accordance with its ON/OFF state, and in that the ON/OFF state of the noncontact switch is determined in accordance with pivoting movement, toward or away from the noncontact switch, of the actuating member responsive to the operation of the handling lever. Thus, even when the handling lever has been turned relatively greatly, the fan-shaped actuating member can remain sufficiently near the noncontact switch, and therefore the noncontact switch can be kept in the ON or OFF state; namely, the noncontact switch can perform its switching function in a stable and reliable manner. Also, the arrangements can advantageously implement a simple and direct switching structure for the ON/OFF control of the cutter-driving electric motor which can minimize erroneous switching operations.

The present disclosure relates to the subject matter of Japanese Patent Application No. 2001-252052, filed Aug. 22, 2001, the disclosure of which is expressly incorporated herein by reference in its entirety.

What is claimed is:

1. An electric lawn mower comprising:
   a machine body section;
   an electric motor mounted in the machine body section for driving a cutter blade;
   a handle extending rearward from the machine body section; and
   a switch operation mechanism provided on the handle for performing ON/OFF control of the electric motor, the switch operation mechanism comprising
      a handling lever pivotally connected to a portion of the handle to undergo pivotal movement about a pivot axis;
      a generally fan-shaped actuating member pivotally connected to the handle in such a manner that the actuating member is pivotable about the pivot axis in response to operation of the handling lever;
      a noncontact reed switch for turning on or off the electric motor in accordance with an ON/OFF state of the noncontact reed switch, the ON/OFF state of the noncontact reed switch being determined in accordance with pivoting movement, toward or away from the noncontact reed switch, of the actuating member responsive to the operation of the handling lever; and
      a clutch mechanism provided between the handling lever and the actuating member for bringing the handling lever and the actuating member into or out of engagement with each other in response to the operation of the handling lever, the clutch mechanism including
         a lever member pivotally connected to the handle to undergo pivotal movement about the pivot axis;
         an engaging pin provided on the actuating member;
         a hook member pivotally connected to the lever member for hooking engagement with the engaging pin, the hook member being pivotally movable between a first position in which the hook member is disengaged from the engaging pin, and a second position in which the hook member is engaged with the engaging pin, the hook member being normally disposed in the first position;

a hook driving rod having one end pivotally connected to the hook member and the other end slidably coupled to a distal end of the lever member and being manually operated to move the hook member into the second position;

a first tension spring for urging the hook member toward the first position; and a second tension spring for urging the actuating member toward the noncontact reed switch to maintain the noncontact switch in the OFF state when the handling lever is out of engagement with the actuating member.

2. An electric lawn mower comprising: a machine body section; an electric motor mounted in the machine body section for driving a cutter blade; a handle connected to and extending rearward of the machine body section for gripping by an operator to guide the lawn mower; a bail bar pivotably mounted to the handle for pivotal movement about a pivot axis toward and away from the handle; a switch having ON and OFF states for controlling the electric motor, the switch normally being in the OFF state; an actuating member movable between a first position wherein the actuating member maintains the switch in the OFF state and a second position wherein the actuating member places the switch in the ON state; and a clutch mechanism pivotably mounted to the handle and connected to the bail bar for pivotal movement therewith about the pivot axis, the clutch mechanism having a clutching state wherein the clutch mechanism engages with the actuating member to effect movement thereof from the first position to the second position in response to pivotal movement of the bail bar toward the handle and a non-clutching state wherein the clutch mechanism is not engaged with the actuating member so that pivotal movement of the bail bar toward the handle does not effect movement of the actuating member, and a manually-operated actuator for enabling the operator to actuate the clutch mechanism from the non-clutching state to the clutching state.

3. An electric lawn mower according to claim 2; wherein the clutch mechanism further comprises a lever member pivotably mounted to the handle and connected to the bail bar for pivotal movement therewith about the pivot axis, a hook member pivotably mounted on the lever member for pivotal movement into and out of engagement with the actuating member and connected to the manually-operated actuator, and a spring for applying a biasing force to urge the hook member out of engagement with the actuating member thereby placing the clutch mechanism in the non-clutching state, whereby manual operation of the actuator pivots the hook member against the biasing force of the spring into engagement with the actuating member thereby placing the clutch mechanism in the clutching state.

4. An electric lawn mower according to claim 3; wherein the actuating member has an engaging pin engageable with the hook member.

5. An electric lawn mower according to claim 3; wherein the manually-operated actuator comprises a rod having one end pivotably connected to the hook member and the other end terminating proximate the bail bar, and a manually-depressible knob connected to the other end of the rod, whereby manual depression of the knob by the operator causes the rod to pivot the hook member into engagement with the actuating member.

6. An electric lawn mower according to claim 5; wherein the knob is slidably received in an opening in an upper end of the lever member and projects above the lever member.

7. An electric lawn mower according to claim 5; wherein the handle, bail bar and knob are positioned relative to one another to enable the operator to manually depress the knob while gripping the handle and bail bar with both hands.

8. An electric lawn mower according to claim 3; wherein the switch comprises a noncontact switch.

9. An electric lawn mower according to claim 8; wherein the noncontact switch comprises a noncontact reed switch.

10. An electric lawn mower according to claim 8; wherein the actuating member has an arc-shaped portion that coacts with the noncontact switch to maintain the switch in the OFF state during a major portion of the movement of the actuating member from the first position to the second position.

11. An electric lawn mower according to claim 10; wherein the actuating member is connected to the lever member.

12. An electric lawn mower according to claim 2; wherein the handle, bail bar and manually-operated actuator are positioned relative to one another to enable the operator to manually actuate the actuator while gripping the handle and bail bar with both hands.

13. An electric lawn mower according to claim 2; wherein the switch comprises a noncontact switch.

14. An electric lawn mower according to claim 13; wherein the noncontact switch comprises a noncontact reed switch.

15. An electric lawn mower according to claim 13; wherein the actuating member has an arc-shaped portion that coacts with the noncontact switch to maintain the switch in the OFF state during a major portion of the movement of the actuating member from the first position to the second position.

16. An electric lawn mower according to claim 15; wherein the actuating member is connected to the lever member.

17. An electric lawn mower according to claim 2; wherein the actuating member has an arc-shaped portion that coacts with the switch to maintain the switch in the OFF state during a major portion of the movement of the actuating member from the first position to the second position.

* * * * *